United States Patent [19]

Forrest

[11] 4,386,917

[45] Jun. 7, 1983

[54] SUTURING TRAINING DEVICE AND METHOD

[76] Inventor: Leonard E. Forrest, 3515 E. Scarborough Rd., Cleveland Heights, Ohio 44112

[21] Appl. No.: 302,822

[22] Filed: Sep. 16, 1981

[51] Int. Cl.³ .............................................. G09B 23/28
[52] U.S. Cl. ................................................... 434/267
[58] Field of Search ............... 434/262, 267, 268, 269, 434/272, 273; 69/19.1, 19.3

[56] References Cited

U.S. PATENT DOCUMENTS

| | | | |
|---|---|---|---|
| 758,262 | 4/1904 | Lyden | 69/19.3 |
| 988,331 | 4/1911 | Greulich | 69/19.3 |
| 2,324,702 | 7/1943 | Hoffmann | 434/272 |
| 2,871,579 | 2/1959 | Niiranen | 434/268 |
| 3,339,290 | 9/1967 | Doyle | 434/267 |

Primary Examiner—Harland S. Skogquist
Attorney, Agent, or Firm—James A. Hudak

[57] ABSTRACT

An apparatus (10) and method for using same for practicing suturing techniques is disclosed. A plurality of layers (16, 20, 22) of material simulating human tissue to be sutured are stretched across an open frame (12) and then slit to simulate a wound or incision. An additional layer (14) is stretched across the frame beneath the other layers to simulate material which is to be avoided in the suturing process. The sutured layers include a first layer (16) simulating a layer of fascia and a second layer (20) simulating the dermis. These layers are separated by a layer (18) simulating fatty tissue. A top layer (22) is adhered to the second layer (20) and simulates a layer of skin to be sutured.

8 Claims, 2 Drawing Figures

SUTURING TRAINING DEVICE AND METHOD

TECHNICAL FIELD

The present invention relates to devices for practicing the art of suturing, and more particularly to a device which closely simulates actual conditions faced by a doctor in suturing a wound or incision in a human body.

BACKGROUND ART

Prior art devices used in the teaching or practicing of suturing techniques, such as that illustrated in U.S. Pat. No. 3,775,865, include means for suturing only a single layer of simulated tissue and thus are not capable of simulating deep wounds or incisions wherein several separate layers of tissue must be sutured. In addition, these devices do not simulate situations wherein bowel, muscles, nerves, blood vessels, or the like must be avoided during the suturing process.

Because of the foregoing, it has become desirable to develop a device for teaching the art of suturing, and which simulates wounds or incisions which require multiple layers of sutures to close, and which further simulates deeper structures which must be avoided during the suturing process.

SUMMARY OF THE INVENTION

The present invention solves the aforementioned problems associated with the prior art as well as other problems by providing a device which is capable of simulating a deep wound or incision for the purpose of teaching the techniques required for closing such a wound and for practicing such techniques. More specifically, the invention provides a frame within which several layers of tissue-simulating materials are stretched. Each layer simulates a layer of tissue within the human body, including a layer representing a deeper structure which is to be avoided, a layer of deep tissue to be sutured, a layer of fatty tissue, a layer of dermal tissue for subcutaneous suturing, and a top layer of skin to be sutured. Elastic bands are attached to the sutured layers beneath the skin layer to apply tension thereto to simulate the natural stretching of these layers in the human body after they have been separated, e.g., by an incision. Thus, while a deep layer of simulated tissue is being sutured, the sutures must overcome the force tending to hold the wound open as simulated by the elastic bands. At the same time, the elastic bands attached to the upper layer will tend to hold these layers open after the deep layer has been sutured, just as in a real life situation.

DESCRIPTION OF THE PREFERRED EMBODIMENT

Figure 1:
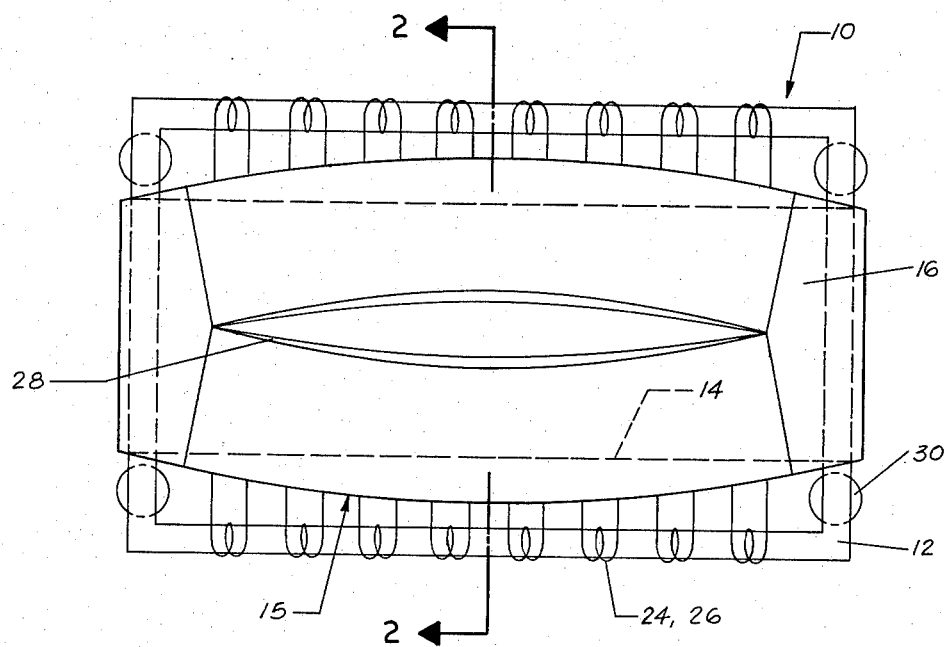
FIG. 1 is a plan view of the invention of this disclosure.
Figure 2:
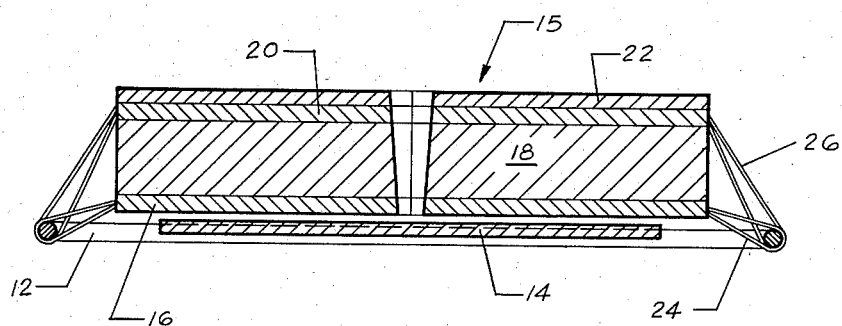
FIG. 2 is a cross-sectional view taken along section-indicating lines 2—2 of FIG. 1.

Referring now to the drawings where the illustrations are for the purpose of describing the preferred embodiment of the present invention and are not intended to limit the invention hereto, FIGS. 1 and 2 illustrate a device 10 for practicing suturing techniques comprising a frame 12 which can be made of wire, plastic, etc., a first rubber sheet 14 stretched across the length of the frame and attached to the ends thereof; a composite layer 15, including a first layer 16 of an elastic material, a layer of foam rubber 18 adhered to the first layer 16, and a second layer of elastic material 20 adhered to the opposite surface of the foam rubber 18; and a top layer 22 of relatively thin elastic material adhered to the second elastic layer 20. The overall length of the first layer 16 is slightly longer than that of the other layers comprising the composite layer 15 so that the ends of the first layer 16 can be attached to the ends of the frame 12 or to the ends of the first rubber sheet 14 after it is attached to the frame 12. A plurality of tension members 24 and 25 are attached to the sides of the frame 12 and to the elastic layers 16 and 20, respectively. This arrangement provides means for separating the edges of the "wound" or "incision" while maintaining the ends thereof relatively together as would be the case with a real incision or wound. Attachments means 30, such as rubber suction cups, are attached to the frame 12 and are used to secure the device to a supporting surface. In this manner, movement of the device when in use is minimized.

As shown in FIG. 1, the first sheet 14 can be latex. The primary function of the first sheet 14 is to simulate a layer of tissue or material which is beneath the tissue which is to be sutured, and which is to be avoided during the suturing process.

The first and second elastic layers 16 and 20 can be any stretchable material or fabric. These layers are coated with a suitable adhesive and are adhered to the opposite faces of the foam layer 18 to define the composite layer 15; the outer layers 16 and 20 representing layers of fascia and dermis, respectively, to be sutured, and the foam rubber layer 18 representing a layer of fatty tissue. The top layer 22 can be a relatively thin sheet of latex rubber which can be coated on one side with an adhesive adhered to the layer 20. The top layer 22 is typically thinner than the first and second elastic layers 16 and 20. In addition, the first sheet 14 is typically thicker than the layers 16 and 20. As shown in the illustrative embodiment, the tension members 24 and 26 are defined by elastic bands which are attached to the sides of frame 12 and stitched or otherwise attached to the layers 16 and 20.

To prepare the device 10 for practice suturing, the first rubber sheet 14 is stretched across the frame 12 and attached thereto by looping the ends of the sheet over the frame and attaching the sheet to itself by stitching or other convenient means. The composite layer 15 is then stretched over the frame 12 and its longer ends are attached thereto by the tension members 24 and 26 as described above. The ends of the first layer 16 are then attached to the ends of the frame 12 or to the looped over ends of the first rubber sheet 14.

The top layer 22, the composite layer 15 including the layers 16 and 20, and the foam layer 18 are slit as shown at 28 in FIG. 1 to simulate a wound or incision. Because of the tension applied by members 24 and 26, the width of the slit 28 at the center of the composite layer 15 is greater than at its ends thus simulating the actual configuration of a wound or incision. Suturing is then started by first suturing the first elastic layer 16, the tension of the first series of tension members 24 being taken up by the sutures, while the second series of tension members 26 hold the top surface of the wound open as would be the case with a real wound or incision.

The next step depends on the area of the body which is being simulated. In some areas, the skin tension is relatively low and the upper layer 22 need only be sutured, however, in other areas skin tension is too great and sutures placed only in the top skin layer 22 could be pulled open. In such cases, the second layer 20, representing a dermal layer, is sutured first, followed by suturing the top layer 22. Thus, the device 10 can be used to simulate the suturing of a minor wound, which would involve only the suturing of the top layer 22, or could simulate the suturing of a deeper wound or incision which would entail the suturing of both layers 16 and 22, or could simulate the suturing of a wound or incision which would necessitate three layers of sutures, i.e., sutures placed in layers 16, 20 and 22. Therefore, the device can be used to simulate wounds or incisions of different depths and/or severity.

Certain modifications and improvements will occur to those skilled in the art upon reading the foregoing. It should be understood that all such modifications and improvements have been deleted herein for the sake of conciseness and readability but are properly within the scope of the following claims.

I claim:

1. A simulator for practicing suture techniques comprising an open rectangular frame, a plurality of layers of material simulating human tissue received within said frame; said plurality of material layers comprising a first layer of elastic material, a layer of foam material having one side adhered to said first elastic layer, and a second layer of elastic material adhered to the opposite side of said foam material; and tension means attached to the long sides of said frame and to one or more of said layers to stretch said one or more layers between portions of said frame.

2. The apparatus as defined in claim 1 further including means for attaching said simulator to a supporting surface to stabilize said apparatus when in use.

3. The apparatus as defined in claim 1 wherein said tension means comprises a first plurality of elastic members attached to opposite sides of said first elastic layer and corresponding long sides of said frame and a second plurality of elastic members attached to opposite sides of said second elastic layer and corresponding long sides of said frame.

4. The apparatus as defined in claim 3 including a third layer of elastic material adhered to said second layer of elastic material.

5. The apparatus as defined in claim 4 wherein said third layer is relatively thinner than said first and second layers.

6. The apparatus as defined in claim 4 or 5 including a fourth layer of elastic material received within said frame and attached thereto, said fourth layer being received beneath said first elastic layer, but not adhered thereto.

7. The apparatus as defined in claim 6 wherein said fourth layer is relatively thicker than said first and second layers.

8. The apparatus as defined in claim 7 wherein said third layer and fourth layers are formed of a latex material.

* * * * *